United States Patent
Williams et al.

(10) Patent No.: US 6,621,820 B1
(45) Date of Patent: Sep. 16, 2003

(54) METHOD AND SYSTEM FOR UPDATING ROUTES IN A ROUTE TABLE ON A CLIENT COMPUTER

(75) Inventors: Brett Williams, Roseville, CA (US); Duane Mentze, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,036

(22) Filed: Apr. 27, 2000

(51) Int. Cl.[7] .......................... H04L 12/28; H04L 12/56
(52) U.S. Cl. .................. 370/395.31; 709/238; 709/244; 711/221
(58) Field of Search ................................. 370/254, 255, 370/389, 395.31, 395.52; 709/223, 239, 242

(56) References Cited

U.S. PATENT DOCUMENTS

| | | | |
|---|---|---|---|
| 6,029,203 A | * | 2/2000 | Bhatia et al. ............... 709/244 |
| 6,253,334 B1 | * | 6/2001 | Amdahl et al. ................. 714/4 |
| 6,449,642 B2 | * | 9/2002 | Bourke-Dunphy et al. . 709/222 |
| 6,466,964 B1 | * | 10/2002 | Leung et al. ............... 709/202 |
| 6,563,821 B1 | * | 5/2003 | Hong et al. ................. 370/389 |
| 2002/0059405 A1 | * | 5/2002 | Angwin et al. ............. 709/223 |

* cited by examiner

*Primary Examiner*—Wellington Chin
*Assistant Examiner*—Jamal A. Fox

(57) ABSTRACT

A method and system for updating routes in a route table on a personal computer operatively connected to at least one peripheral device. The method includes the steps of determining whether a first Device Internet Protocol address in a maintenance list is communicating with the client computer, creating a NIC IP list for all Network Interface Card Internet Protocol addresses bound to a Device Internet Protocol address on the client computer when the first Device Internet Protocol address is not communicating with the client computer, and adding a route table entry including the first Device Internet Protocol Address and an Network Interface Card Internet Protocol address from the NIC IP list to the route table.

13 Claims, 2 Drawing Sheets

METHOD AND SYSTEM FOR UPDATING ROUTES IN A ROUTE TABLE ON A CLIENT COMPUTER

The present invention generally relates to a method and a system for updating routes on a client computer, more particularly, it relates to a method and system for automatically updating routes in a route table located on a computer operatively connected to one or more peripheral devices.

It is very common for a computer to be connected to multiple peripheral devices, such as a printer or scanner. The computer maintains a route table for various gateways and addresses to the multiple peripheral device and network. The route table is then used by the computer to determine where to forward packets on the local network.

As shown in FIG. 1, each route table Entry includes a network address, a netmask, a gateway address, an interface, and a metric. The interface is the computer's Internet protocol ("IP") address, which is the address from which the packets are sent. In a network with multiple peripheral devices, it is common to have several network cards and IP addresses assigned to the computers. For example, a Network Interface Card IP address is an IP address that is bound to the Network Interface Card ("NIC") that uniquely identifies the client computer on a network, which will be referred to as a NIC IP address. There can be more than one NIC, therefore, there may be more than one NIC IP address.

Next, the network address identifies a destination network address, which can be the address of a host or a network, whereas the gateway address is the address where the computer will forward a packet. Similarly, for each peripheral device used by the computer, an IP address is assigned, which will be referred to as a Device IP address. The Device IP address identifies the peripheral device to the client computer, and the NIC IP address uniquely identifies the client computer on a network. Therefore, an operatively connected NIC IP address must be bound to each Device IP address.

There is also a gateway address, which is used only when the computer cannot find the route to the destination IP address in a packet. This is similar to a default address for lost packets. The last address is the Netmask address, which identifies a subnet portion of the destination IP address. Finally, a metric column is used to keep track of an arbitrarily assigned cost for using a particular route. A higher number indicates a higher cost for the use of that particular route. Generally, the metric column is used for determining the best route when there is more than one route to get a packet to its destination.

When a computer uses a static IP address, all the IP addresses described for routing generally remain unchanged when the computer is turned off or rebooted. Furthermore, the NIC IP addresses also remain valid since the same Device IP address that was paired with the NIC IP address remained unchanged. As a result, it is easier to keep track of the routing on a computer using a static IP address. However, on a computer whose IP address changes, for example through an Automatic Private IP Addressing ("APIPA") algorithm, a new IP address is assigned to the computer every time it logs on. When using a Dynamic Host Configuration Protocol ("DHCP") or similar technology, the permanent route through a given gateway is possibly no longer valid since the validity of the route is based upon the IP address obtained at the time the route was created. Thus, the use of a nonstatic IP address will result in invalid routes after the client computer reboots.

Previously, the user had to manually remove the old route and enter a new route to the peripheral device if a route is invalid. One problem is that this manual method generally requires someone with some understanding in network routing to perform the rerouting and edit the route table. However, a typical user does not generally know how to change the routes to these peripheral devices.

Accordingly, an object of the present invention is to provide an improved method for updating routes in a route table on a client computer automatically after the client computer's IP address is changed.

Another object of the present invention is to provide an improved method for updating routes in a route table on a client computer without user invention.

Still another object of the present invention is to provide an improved method for updating routes in a route table on a client computer using a nonstatic IP address.

BRIEF SUMMARY OF THE INVENTION

The present invention generally relates to a method and a system for updating routes on a client computer. More particularly, it relates to a method and system for automatically updating routes in a route table located on a computer operatively connected to one or more peripheral devices. The present method and system can update routes in a route table on a client computer without user intervention. As a result, the present invention accommodates a client computer using a nonstatic IP address by updating routes in the route table automatically every time the computer reboots.

The present invention first determines whether a first Device IP address in a maintenance list is communicating with the client computer. When the first Device IP address is not communicating with the client computer, a NIC IP list is created, which includes all the NIC IP addresses bound to a Device IP address on the client computer. Then, a route table entry with the first Device IP address and a NIC IP address from the NIC IP list is added to the route table.

BRIEF DESCRIPTION OF THE DRAWINGS

Other objects, features and advantages will become apparent upon reading the following detailed description, in conjunction with the attached drawings, in which.

DETAILED DESCRIPTION

Broadly stated, the present invention is directed to an improved method and system for updating routes on a client computer. The present invention is able to update the routes of a client computer without user intervention. Using the present invention, a client computer with a nonstatic IP address can update its routes automatically each time the client computer reboots and obtains a new IP address.

Figures 1, 2:
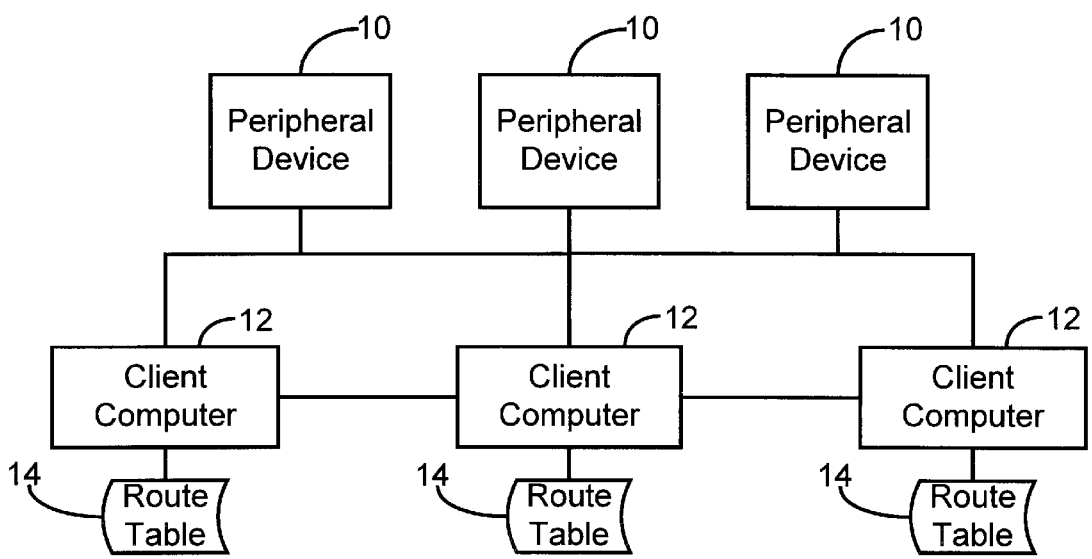
FIG. 1 is a view of an exemplary route table on a client computer.
FIG. 2 is a block diagram of an exemplary network system in which the present method is implemented; and, FIG. 3 is a flowchart describing the preferred steps involved in updating routes in the route table in the present invention.

Turning now to FIG. 2, a block diagram of an exemplary network system is shown in which the present method can be implemented. Although FIG. 2 illustrates client computers connected to multiple peripheral devices via a network, it is only an example of how the client computers may be connected to the peripheral devices, which results in multiple IP addresses in the route table. However, other connections are possible and are within the scope of the present invention. In this example, several peripheral devices 10 are connected to three client computers 12 using nonstatic IP addresses. In other words, each client computer's IP address changes every time it reboots or is turned off. As explained earlier, a route table 14 is maintained on the client computer 12, which keeps track of all the Device IP addresses and NIC IP addresses. However, when the IP address of the client computer changes, the routing addresses may be invalid. Generally, for each peripheral device that the client computer uses, it is assigned a Device IP address. However, the NIC IP address associated with the Device IP address may be invalid if the client computer's IP address changes, which makes the route invalid. As a result, the routes in the route table 14 must be updated each time after the client computer 12 is turned off. The present invention provides an improved method and system to update the route table.

Figure 3:
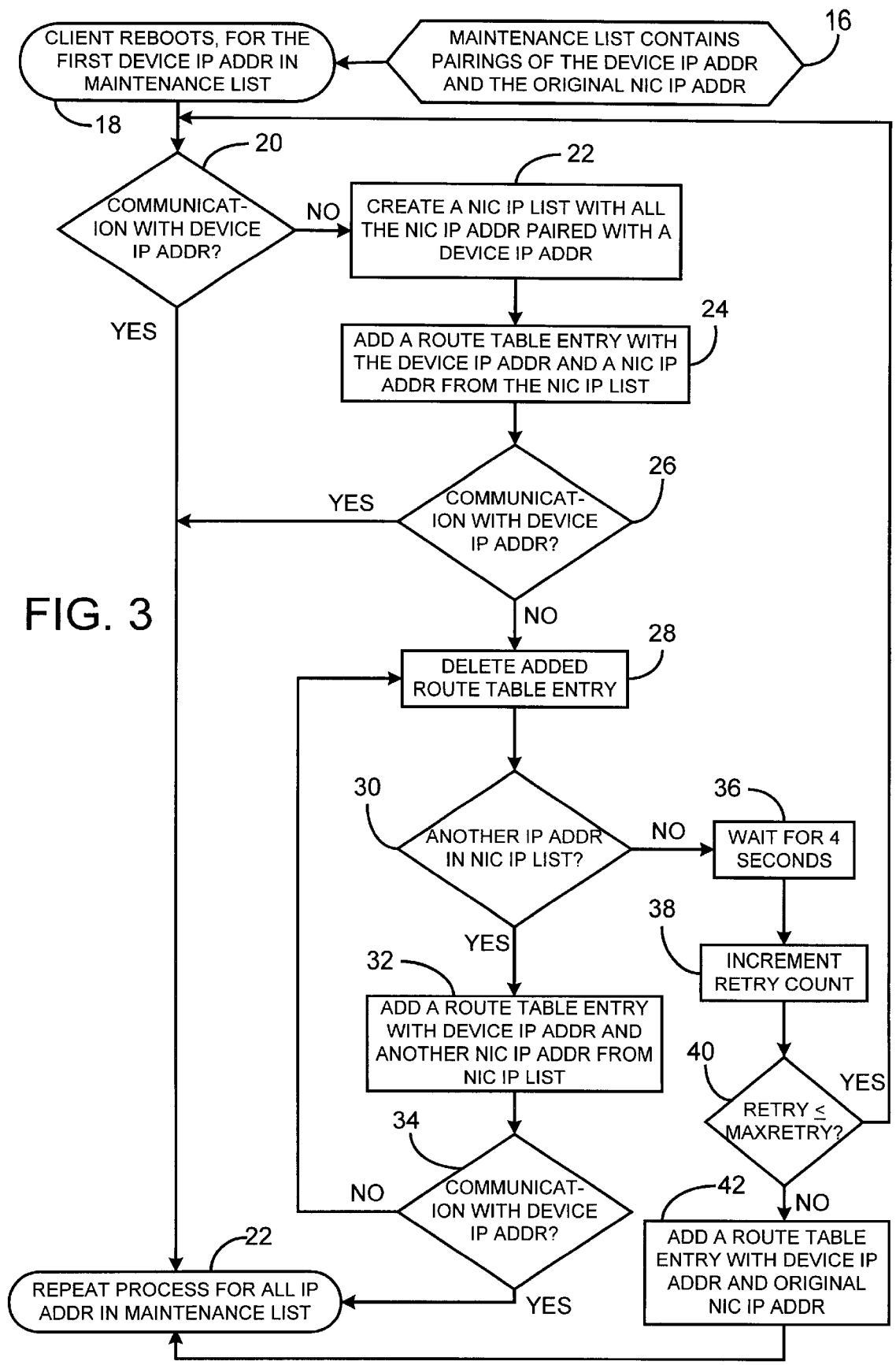

FIG. 3 shows a flowchart describing the preferred steps involved in updating routes in the route table in the present invention. Generally, the client computer 12 maintains a list of all the Device IP addresses paired with its original NIC IP address for each peripheral device that it uses (block 16). In practice, the list may be contained in a system file with many other operational settings, but, for clarification purposes, it shall be referred as a maintenance list which contains all the Device IP addresses paired with an original NIC IP address before the computer is turned off or its IP address is changed. In the preferred embodiment, the process is initiated when the client computer is rebooted or turned on, but this is just one way to implement the present invention. The process can be initiated in other ways. For example, the user can initiate the process without rebooting or turning off the client computer 12. These alternative initiation methods are within the scope of the present invention.

After the process is initiated and for the first Device IP address in the maintenance list (block 18), the first step is to determine if this first Device IP address is communicating with the client computer 12 (block 20). This step can be done by, for example, pinging the first Device IP address. Once it is confirmed that the first Device IP address is communicating with the client computer (block 20), the next step is to repeat the determine step for the next Device IP address in the maintenance list (block 22). In other words, the next step is to determine if the next Device IP address in the maintenance list is communicating with the client computer 12 (block 22). This determining step is repeated for all the Device IP addresses in the maintenance list.

On the other hand, if the first Device IP address is not communicating (block 20), a NIC IP list must be created (block 22). The NIC IP list contains all the NIC IP addresses bound to a Device IP address on the client computer. A NIC IP address from the NIC IP list is then paired with the first Device IP address on a route table entry, which is added to the route table (block 24). With this added route table entry, the first Device IP address is then checked again for operable communication with the client computer 12 (block 26).

If the first Device IP address is communicating with the client computer (block 26), the process is repeated for the next Device IP address in the maintenance list (block 22). Again, the process does not end until all the Device IP addresses in the maintenance list are processed (block 22). However, if the first Device IP address is still not communicating with the client computer 12 (block 22), the added route table entry is deleted from the route table 14 (block 28). Then, the next step is to check if the NIC IP list contains another NIC IP address, which may be paired with the first Device IP address (block 30). If another NIC IP address is available (block 30), another route table entry, which includes this other NIC IP address and the first Device IP address, is added to the route table 14 (block 32). With this other NIC IP address, the first IP Device address is checked again for communication with the client computer 12 (block 34). The process is again repeated for the next Device IP address in the maintenance list if communication is verified (block 22). Otherwise, this added route table entry will be deleted (block 28), and the NIC IP list is checked again for another NIC IP address (block 30). The steps are repeated for each NIC IP address in the NIC IP list until either all the NIC IP addresses have been exhausted or the first Device IP address has finally established communication with client computer 12.

If all the NIC IP addresses have been exhausted (block 34), a four second delay (block 36) and an increment retry count (block 38) will follow. The four second wait time is arbitrary, and other predetermined times can be used and are within the scope of the present invention. In addition, an arbitrary maximum number of retries will also be assigned. If the incremented retry number is less than the maximum retry number (block 40), the process is repeated from the beginning for the same first Device IP address again (block 20). The process is repeated again for the first Device IP address and not the next Device IP address in the maintenance list, because the peripheral device 10 may not be communicating with the client computer 12 since it may be turned off. These retries give the user sufficient time to turn on the peripheral device before the process gives up on the First Device IP address and moves onto the next Device IP address in the maintenance list. However, neither a wait time nor a retry count is necessary. The invention can be implemented without neither the wait time nor the retry count, and these methods are within the scope of the invention.

Once the retry number is equal to or greater than the maximum retry number allowed (block 40), then a route table entry with the first Device IP address and the original NIC IP address is added to the route table 14 (block 42). After an exhausted attempt at pairing a valid route to the first Device IP address, the original NIC IP address is paired back with the first Device IP address to restore the original information in the route table 14 before the process was activated. Then, the next step is to repeat the whole process for the next Device IP address in the maintenance list (block 22). The process is repeated until all the Device IP addresses in the list have been processed.

While various embodiments of the present invention have been shown and described, other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for updating routes in a route table on a personal computer operatively connected to at least one peripheral device, the method comprising the steps of:

determining whether a first Device Internet Protocol address in a maintenance list is communicating with the client computer;

creating a NIC IP list for all Network Interface Card Internet Protocol addresses bound to a Device Internet Protocol address on the client computer when the first Device Internet Protocol address is not communicating with the client computer; and, adding a route table entry including the first Device Internet Protocol Address and an Network Interface Card Internet Protocol address from the NIC IP list to the route table.

2. The method according to claim 1 further comprises the step of repeating said determining step for a next Internet Protocol Address in the maintenance list when the first Internet Protocol Address is communicating with the client computer.

3. The method according to claim 1 wherein said determining step is repeated for all the Device Internet Protocol Addresses in the maintenance list.

4. The method according to claim 1 wherein said adding step further comprises the steps of:
   determining whether the first Device Internet Protocol Address with the added Network Interface Card Internet Protocol Address is communicating with the client computer;
   deleting the route table entry from the route table when the first Device Internet Protocol Address with the added Network Interface Card Internet Protocol Address is not communicating; and,
   repeating said determining step for a next Device Internet Protocol Address in the maintenance list when the first Device Internet Protocol Address with the added Network Interface Card Internet Protocol Address is communicating.

5. The method according to claim 4 wherein said deleting step further comprises the step of finding another Network Interface Card Internet Protocol Address in the NIC IP list.

6. The method according to claim 5 wherein said determining step further comprises the step of repeating said step of adding a route table entry using another Network Interface Card Internet Protocol address when another Network Interface Card Internet Protocol address is available in the NIC IP list.

7. The method according to claim 5 wherein said finding step further comprises the step of adding a route table entry using the first protocol address with the original Network Interface Card Internet Protocol address in the route table after performing the predetermined number of retries when another Network Interface Card Internet Protocol address is not available in the NIC IP list.

8. The method according to claim 5 wherein said finding step further comprises the step of repeating said determining step for the first Device Internet Protocol address when another Network Interface Card Internet Protocol Address is not available in the NIC IP list.

9. The method according to claim 8 wherein prior to said repeating step further comprises the step of waiting for a predetermined time.

10. The method according to claim 8 wherein said repeating step is preformed for a predetermined number of retries.

11. The method according to claim 10 wherein said repeating step further comprises the step of adding a route table entry using the first protocol address with the original Network Interface Card Internet Protocol address in the route table after performing the predetermined number of retries.

12. A system for updating routes in a route table on a client computer, comprising:
    means for determining whether a first Device Internet Protocol address in a maintenance list is communicating with the client computer;
    means for creating a NIC IP list for all Network Interface Card Internet Protocol addresses bound to a Device Internet Protocol address on the client computer when the first Device Internet Protocol address is not communicating with the client computer; and,
    means for adding a route table entry including the first Device Internet Protocol Address and an Network Interface Card Internet Protocol address from the NIC IP list to the route table.

13. A client computer adapted to update routes in a route table on a client computer, comprising:
    means for determining whether a first Device Internet Protocol address in a maintenance list is communicating with the client computer;
    means for creating a NIC IP list for all Network Interface Card Internet Protocol addresses bound to a Device Internet Protocol address on the client computer when the first Device Internet Protocol address is not communicating with the client computer; and,
    means for adding a route table entry including the first Device Internet Protocol Address and an Network Interface Card Internet Protocol address from the NIC IP list to the route table.

* * * * *